US011947587B2

(12) United States Patent
Davies

(10) Patent No.: US 11,947,587 B2
(45) Date of Patent: *Apr. 2, 2024

(54) METHODS, SYSTEMS, AND MEDIA FOR GENERATING SENTIMENTAL INFORMATION ASSOCIATED WITH MEDIA CONTENT

(71) Applicant: Google LLC, Mountain View, CA (US)

(72) Inventor: Benedict John Davies, London (GB)

(73) Assignee: GOOGLE LLC, Mountain View, CA (US)

( * ) Notice: Subject to any disclaimer, the term of this patent is extended or adjusted under 35 U.S.C. 154(b) by 368 days.

This patent is subject to a terminal disclaimer.

(21) Appl. No.: 17/391,551

(22) Filed: Aug. 2, 2021

(65) Prior Publication Data

US 2021/0357446 A1 Nov. 18, 2021

Related U.S. Application Data

(63) Continuation of application No. 16/375,192, filed on Apr. 4, 2019, now Pat. No. 11,080,320, which is a
(Continued)

(51) Int. Cl.
*G06F 16/43* (2019.01)
*G06F 16/435* (2019.01)
(Continued)

(52) U.S. Cl.
CPC ........... *G06F 16/436* (2019.01); *G06Q 30/00* (2013.01); *H04N 21/252* (2013.01);
(Continued)

(58) Field of Classification Search
CPC .... G06F 16/436; G06Q 30/00; H04N 21/252; H04N 21/2668; H04N 21/4756;
(Continued)

(56) References Cited

U.S. PATENT DOCUMENTS

| 4,646,145 A | 2/1987 | Percy et al. |
| 5,778,135 A | 7/1998 | Ottensen et al. |

(Continued)

FOREIGN PATENT DOCUMENTS

| EP | 1388260 | 6/2006 |
| EP | 2276241 | 1/2011 |

(Continued)

OTHER PUBLICATIONS

Asur, S. and Huberman, B. A., "Predicting the Future with Social Media," In Proceedings of WI-IAT 2010 IEEE/WIC/ACM International Conference on Web Intelligence and Intelligent Agent Technology, Toronto, CA, Aug. 31-Sep. 3, 2010, vol. 1, pp. 492-499.

(Continued)

*Primary Examiner* — Hicham Skhoun
(74) *Attorney, Agent, or Firm* — Brake Hughes Bellermann LLP

(57) ABSTRACT

In accordance with some embodiments, a method for generating sentimental information associated with media content is provided, the method comprising: receiving user input data corresponding to a user; identifying a portion of the media content item based on the user input data; determining a sentiment based on the user input data, wherein the sentiment is one of a positive sentiment which indicates that the media content item was liked by the user or a negative sentiment which indicates that the media content item was disliked by the user; determining an amount of the sentiment based on the user input data; associating the amount of the sentiment with the portion of the media content item; and generating, for the media content item, sentimental information that indicates the amount of the sentiment associated with at least one portion of the media content item.

18 Claims, 7 Drawing Sheets

Related U.S. Application Data continuation of application No. 14/216,591, filed on Mar. 17, 2014, now abandoned, which is a continuation of application No. 13/205,240, filed on Aug. 8, 2011, now Pat. No. 8,719,277.

(51) Int. Cl.

| | | |
|---|---|---|
| G06Q 30/00 | (2023.01) | |
| H04N 21/25 | (2011.01) | |
| H04N 21/2668 | (2011.01) | |
| H04N 21/475 | (2011.01) | |
| H04N 21/658 | (2011.01) | |
| H04N 21/845 | (2011.01) | |

(52) U.S. Cl.
CPC ..... *H04N 21/2668* (2013.01); *H04N 21/4756* (2013.01); *H04N 21/4758* (2013.01); *H04N 21/6582* (2013.01); *H04N 21/845* (2013.01); *H04N 21/8456* (2013.01)

(58) Field of Classification Search
CPC .......... H04N 21/4758; H04N 21/6582; H04N 21/845; H04N 21/8456
USPC ........................................ 707/748
See application file for complete search history.

(56) References Cited

U.S. PATENT DOCUMENTS

| | | | |
|---|---|---|---|
| 6,602,297 B1 | 8/2003 | Song | |
| 6,888,457 B2 | 5/2005 | Wilkinson et al. | |
| 7,672,864 B2 | 3/2010 | Nair et al. | |
| 7,844,482 B1* | 11/2010 | Larson | G06Q 30/0202 |
| | | | 705/7.31 |
| 7,889,073 B2 | 2/2011 | Zalewski | |
| 8,321,534 B1 | 11/2012 | Roskind et al. | |
| 8,386,935 B2* | 2/2013 | van Zwol | G06F 3/04817 |
| | | | 715/723 |
| 8,508,494 B2 | 8/2013 | Moore | |
| 9,129,008 B1 | 9/2015 | Kuznetsov | |
| 2003/0067554 A1 | 4/2003 | Klarfeld et al. | |
| 2003/0118974 A1 | 6/2003 | Obrador | |
| 2005/0114142 A1 | 5/2005 | Asukai et al. | |
| 2005/0289582 A1 | 12/2005 | Tavares et al. | |
| 2006/0129458 A1 | 6/2006 | Maggio | |
| 2007/0157239 A1 | 7/2007 | Wang et al. | |
| 2007/0214471 A1 | 9/2007 | Rosenberg | |
| 2007/0250901 A1 | 10/2007 | McIntire et al. | |
| 2008/0052371 A1 | 2/2008 | Partovi et al. | |
| 2009/0055385 A1 | 2/2009 | Jeon et al. | |
| 2009/0089833 A1 | 4/2009 | Saito et al. | |
| 2009/0158308 A1 | 6/2009 | Weitzenfeld et al. | |
| 2009/0165030 A1* | 6/2009 | Cronin | H04N 21/4758 |
| | | | 725/14 |
| 2010/0070992 A1 | 3/2010 | Morris et al. | |
| 2010/0070999 A1* | 3/2010 | Morris | H04N 7/17318 |
| | | | 725/39 |
| 2010/0153210 A1 | 6/2010 | Oh et al. | |
| 2011/0063248 A1 | 3/2011 | Yoon | |
| 2011/0154390 A1 | 6/2011 | Smith | |
| 2011/0181552 A1 | 7/2011 | Goertz et al. | |
| 2011/0273396 A1 | 11/2011 | Chung | |
| 2011/0295848 A1 | 12/2011 | Peters et al. | |
| 2012/0084339 A1 | 4/2012 | Singh et al. | |
| 2012/0159616 A1 | 6/2012 | Griffin et al. | |
| 2012/0215903 A1 | 8/2012 | Fleischman et al. | |
| 2012/0311625 A1 | 12/2012 | Nandi | |
| 2012/0323566 A1 | 12/2012 | Johnston et al. | |
| 2013/0063364 A1 | 3/2013 | Moore | |
| 2013/0080348 A1* | 3/2013 | Pantaliano | G06Q 30/02 |
| | | | 705/347 |
| 2013/0127765 A1 | 5/2013 | Behdasht et al. | |
| 2013/0278498 A1 | 10/2013 | Jung et al. | |
| 2015/0106155 A1* | 4/2015 | Castellanos | G06Q 50/01 |
| | | | 705/7.29 |

FOREIGN PATENT DOCUMENTS

| | | |
|---|---|---|
| KR | 20100107036 | 10/2010 |
| RU | 24303 | 7/2002 |
| WO | WO 2006126116 | 11/2006 |
| WO | WO 2009012578 | 1/2009 |
| WO | WO 2010035249 | 4/2010 |

OTHER PUBLICATIONS

Broz, B. et al., "Touch Screen Technologies", last updated Oct. 2010, pp. 1-45, available at: http://courses.engr.illinois.edu/ece317/presentations/Touch_Screen_Pres.pdf.
International Search Report and Written Opinion dated Nov. 1, 2012 in International Patent Application No. PCT/US2012/049838.
Lo, Y.W. and Potdar, V., "A Review of Opinion Mining and Sentiment Classification Framework in Social Networks", In Proceedings of 2009 3rd IEEE International Conference on Digital Ecosystems and Technologies, Istanbul, TR, Jun. 1-3, 2009, pp. 396-401.
Na, J. et al., "Comparing Sentiment Expression in Movie Reviews from Four Online Genres", in Online Information Review, vol. 34, No. 2, Jan. 1, 2010. pp. 317-338.
Notice of Allowance dated Apr. 1, 2021 in U.S. Appl. No. 16/375,192.
Notice of Allowance dated Nov. 12, 2018 in KR Patent Application No. 10-2014-7003314.
Notice of Allowance dated Dec. 16, 2013 in U.S. Appl. No. 13/205,240.
Office Action dated Feb. 13, 2013 in U.S. Appl. No. 13/205,240.
Office Action dated Mar. 8, 2018 in CN Patent Application No. 201280036367.8.
Office Action dated Mar. 27, 2018 in U.S. Appl. No. 14/216,591.
Office Action dated Mar. 30, 2016 in U.S. Appl. No. 14/216,591.
Office Action dated May 2, 2017 in CN Patent Application No. 201280036367.8.
Office Action dated May 19, 2018 in KR Patent Application No. 10-2014-7003314.
Office Action dated Jul. 2, 2015 in U.S. Appl. No. 14/216,591.
Office Action dated Jul. 20, 2017 in U.S. Appl. No. 14/216,591.
Office Action dated Aug. 14, 2013 in U.S. Appl. No. 13/205,240.
Office Action dated Sep. 2, 2016 in CN Patent Application No. 201280036367.8.
Office Action dated Oct. 6, 2020 in U.S. Appl. No. 16/375,192.
Office Action dated Oct. 25, 2018 in U.S. Appl. No. 14/216,591.
Office Action dated Nov. 16, 2017 in CN Patent Application No. 201280036367.8.
Office Action dated Nov. 28, 2018 in CN Patent Application No. 201280036367.8.
Office Action dated Dec. 16, 2016 in U.S. Appl. No. 14/216,591.
Park, W.I. et al., "An Agent-based Personalized Multimedia Jukebox for Mobile Devices Using Consumption Sentiment", in Proceedings of 2010 Digest of Technical Papers International Conference on Cnsumer Electronics, Las Vegas, NV, Jan. 9-13, 2010, pp. 249-250.
Patel, N.V. and Sethi, I.K., "Video Classification Using Speaker Identification", In Proceedings of SPIE: Storage and Retrieval for Image and Video Databases V, vol. 3022, San Jose, CA, Feb. 8, 1997, pp. 218-225.
Search Report dated Mar. 5, 2015 in EP Patent Application No. 12822175.1.
Yankelevich, M., "Best Practices for Sentiment Analysis", Webinar, Solution Providers: Freedom OSS, May 2, 2011. pp. 1-3.

\* cited by examiner

METHODS, SYSTEMS, AND MEDIA FOR GENERATING SENTIMENTAL INFORMATION ASSOCIATED WITH MEDIA CONTENT

CROSS-REFERENCE TO RELATED APPLICATIONS

This application is a continuation of U.S. patent application Ser. No. 16/375,192, filed Apr. 4, 2019, which is a continuation of U.S. patent application Ser. No. 14/216,591, filed Mar. 17, 2014, which is a continuation of U.S. patent application Ser. No. 13/205,240, filed Aug. 8, 2011, each of which is hereby incorporated by reference herein in its entirety.

BACKGROUND

The Internet provides access to a wide variety of content. For instance, media such as images, audio, video, and web pages for a myriad of different topics are accessible through the Internet. Users can access this media through various devices. For example, a user can use hand held devices such as cell phones to access and play media. Viewers of media can also create data that is associated with the media. Ranking, liking, or publishing the viewing of the media to a social networking site are exemplary ways users can create data associated with media. This data, however, is typically related to the entire piece of media, and not to particular portions of the media or with characters/objects present in the media.

SUMMARY

In general, one aspect of the subject matter described in this specification can be embodied in methods for receiving user input data that includes a sentimental identifier and an indication of at least one of an amount of pressure and an amount of time used to select a sentimental input. The user input data is associated with media, and the associated media includes a plurality of objects. For each user input data, the user input data is associated with a portion of the associated media. The user input data is aggregated based upon the portion of the associated media. An average sentiment value is determined based upon the sentimental identifier and the indication of at least one of the amount of pressure and the amount of time used to select a sentimental input for at least one of the displayed objects. Other implementations of this aspect include corresponding systems, apparatuses, and computer-readable media, configured to perform the actions of the method.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Viewers of media can provide input based upon how much they dislike/like a particular portion of the media. Examples of media include, but are not limited to, streaming audio, streaming video, audio files, and video files. The input can be associated with a particular object or character within the portion of the media. Once sentimental information has been collected, a user can dynamically create a list of their most liked, funniest, scariest, most disliked, etc., media clips. In addition, reports can be generated using sentimental information from multiple users to determine how well an object, character, or media is received.

As used throughout this document, a sentimental input is a component that allows a user to record a sentiment. The sentimental input is associated with one or more sentiments. The sentimental input may allow a user to specify a sentimental amount. For example, the sentimental amount may allow a user to specify that they thought a portion of media was just okay, that they liked it, or that they loved it. The sentimental amount indicates the level of sentiment. A sentimental identification is used to distinguish between the various possible sentiments, such as, positive, negative, funny, scary, etc. Sentimental information is a collection of data that is associated with a particular recording of a user's sentiment. It can include various data, such as, but not limited to, the sentimental amount, sentimental identification, media identification, start time of user input, end time of user input, location within the media associated with the user's input, demographic data, etc.

Figure 1:
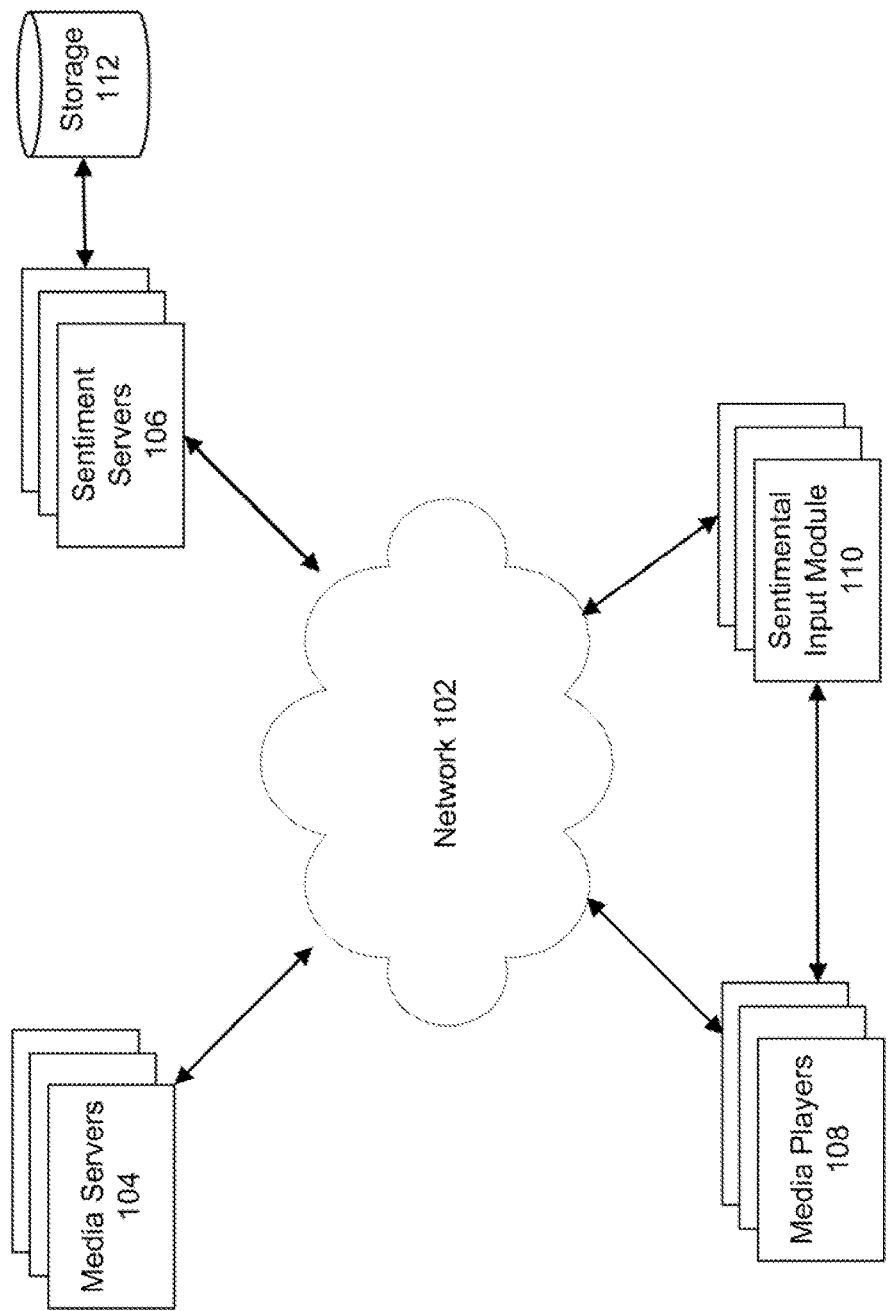
FIG. 1 is a block diagram of an example environment in which data associated with media can be created, stored, and used in accordance with an illustrative implementation.

FIG. 1 is a block diagram of an example environment in which data associated with media can be created, stored, and used in accordance with an illustrative implementation. The example environment 100 includes a network 102, such as a local area network (LAN), a wide area network (WAN), the Internet, or a combination thereof. The network 102 connects media servers 104, media players 108, sentimental input modules 110, and sentiment servers 106. The example environment 100 may include many thousands of media servers 104, media players 108, sentiment servers 106, and sentimental input modules 110.

The media servers 104 provide media players 108 access to media. Media can include, but are not limited to, music files, videos, movies, etc. Media can be rendered on a media player. Media can be stored in media files on the media servers 104 or another device (not illustrated) that is accessible by a media server. Media and media files are accessible over the network 102 using various protocols known to those of skill in the art, such as, HyperText Transfer Protocol (HTTP), Peer-to-Peer (P2P) protocols, etc.

Media players 108 can render the media for viewing/listening. A user can indicate how much they liked or disliked a particular media, a part of the media, or an object within the media using a sentimental input module 110. A portion of the media can refer to the entire media, a particular time or period in the media, displayed objects within a video, or audible objects within audio media. Displayed objects in a video can include displayed objects in a video such as a character, a prop, an audible portion, such as a narrator, or any other item that is visually or audibly present in a particular video. An object in an audio file can include audible objects such as an instrument, singer, narrator, etc. In one implementation, a sentimental input module 110 is integrated into a media player 108. In another implementation, the sentimental input module 110 is integrated into a second device that is distinct from the media player 108. For example, the sentimental input module 110 can be integrated into a cell phone, notebook, table, personal digital assistant (PDA), etc. Input from a user can be transmitted to one or more sentiment servers 106. In one implementation the functionality of a media server 104 and the functionality of a sentiment server 106 can be integrated into a single server. The sentiment servers 106 can store the received input in storage 112. Storage 112 can be any storage known to those of skill in the art, such as, a database, a hard drive, a remote data store, etc. As described in greater detail below, the stored user input can be used for a variety of purposes.

Figure 2A:
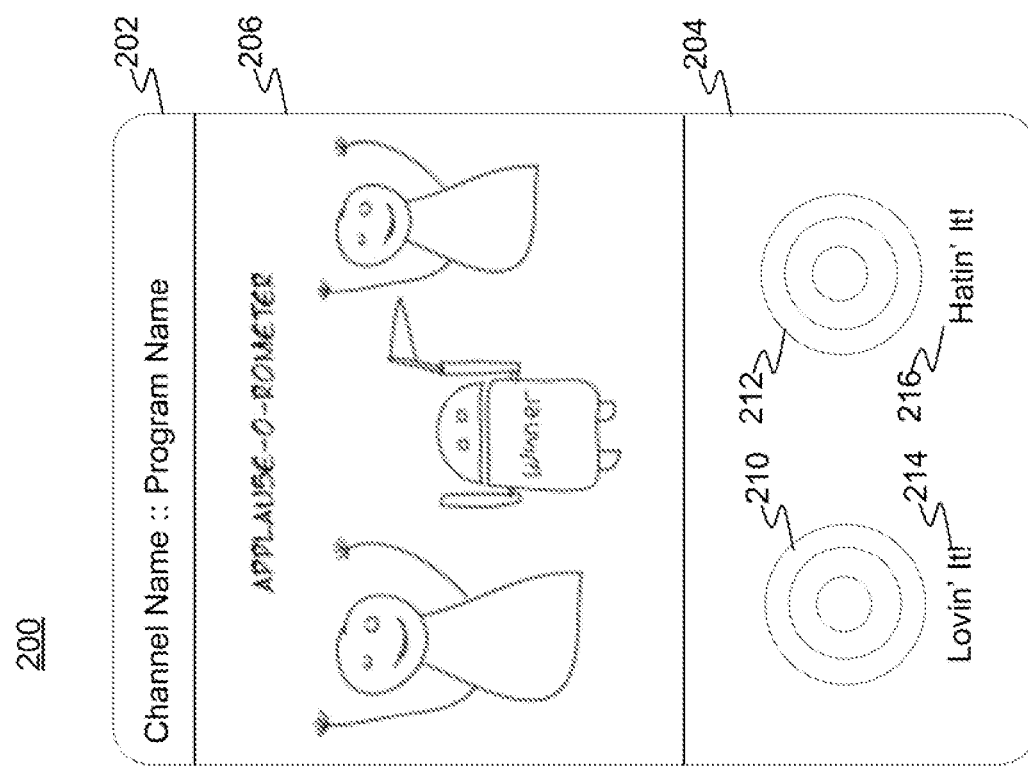
FIG. 2A is an illustration of a device that can play media and record sentimental information in accordance with an illustrative implementation.

FIG. 2A is an illustration of a device that can play media and record sentimental information in accordance with an illustrative implementation. Media can be retrieved or streamed from one or more media servers 104. In one implementation, a media player has a screen to display video media. The device 200 can play a video in a viewing portion 206 of the screen. Information associated with the media can be displayed in an information portion 202 of the screen. Information can be contained within the media itself, stored separately from the media, or may be retrieved from a remote device, such as a media server 104. A sentimental portion 204 of the screen can be used to collect input such as sentimental values from a user.

A positive sentimental input 210, indicated by the positive label 214, can record how much a particular portion of a particular media was liked. Similarly a negative sentimental input 212, indicated by the negative label 216, can record how much a particular portion of the media was disliked. Other labels can be used such as thumbs up and thumbs down icons, other wording, etc. The input buttons 210, 212 can be configured to receive user inputs and device 200 can, in response, generate and send messages comprising data representative of the sentimental input, for example the like/dislike aspect and optionally a quantity of like/dislike. In one implementation, the sentimental portion 204 of the screen includes a touch screen. The touch screen can be capable of capturing the pressure used to select a sentimental input. The pressure used to select a particular sentimental input can correspond to an amount that a particular portion of the media was liked/disliked. For example, a user can slightly press the negative sentimental input 212 during a scene in a movie that the user slightly disliked. In another scene of the movie, that the user loves, the positive sentimental input 210 can be pressed using a larger amount of pressure. In one implementation, the amount of pressure used to press any particular sentimental input is detected by the touch screen, recorded, and can be visualized. For example, as the amount of pressure increases the number of rings highlighted can be increased. In addition or alternatively, the labels 214 and 216 may also change based upon the amount of pressure. For example, the positive label 214 may change from "Like it," "Love it," and "LOVE IT!" based upon the amount of pressure associated with the positive sentiment input 210. The media player 220 can transmit the sentimental information to a sentimental server 106 using, for example, the network 102.

In another implementation, the sentimental portion 204 of the screen is divided into two or more portions, with each portion corresponding to a sentiment. In one implementation, the sentimental portion 204 is divided into a positive portion and a negative portion. As the user presses on the positive portion the background color of the positive portion may change colors. Similarly, the background color of the negative portion can also change colors based upon the amount of pressure applied to the negative portion. The colors used in the background can be associated with a particular sentiment. For example, green, blue, and purple can be associated with a positive sentiment and yellow, orange, and red can be associated with a negative sentiment.

Sentimental inputs can also be used to capture information regarding sentiments other than positive or negative. For example, how scary or gross portions of a particular media are can be captured and recorded. Any number of sentimental inputs can be combined to capture the desired sentiments. In one implementation, a neutral sentiment can be assumed when none of the possible sentimental inputs is pressed.

In yet another example, a single sentimental portion 204 is provided and gestures are used to determine the sentimental identification, such as positive or negative. In one implementation, a positive sentiment can be recorded by pressing on the sentimental portion 204 and moving to the left, and a negative sentiment can be recorded by pressing on the sentimental portion 204 and moving to the right. Of course, other gestures are possible and gestures can also be mapped to other sentiments.

In other implementations, the sentimental amount can be based upon something other than the amount of pressure applied to a sentimental input. For example, the amount of time a particular sentimental input is pressed is used to indicate how much a user liked/disliked a portion of media. In another implementation, dials or sliders can be used to indicate an amount of sentiment.

Figure 2B:
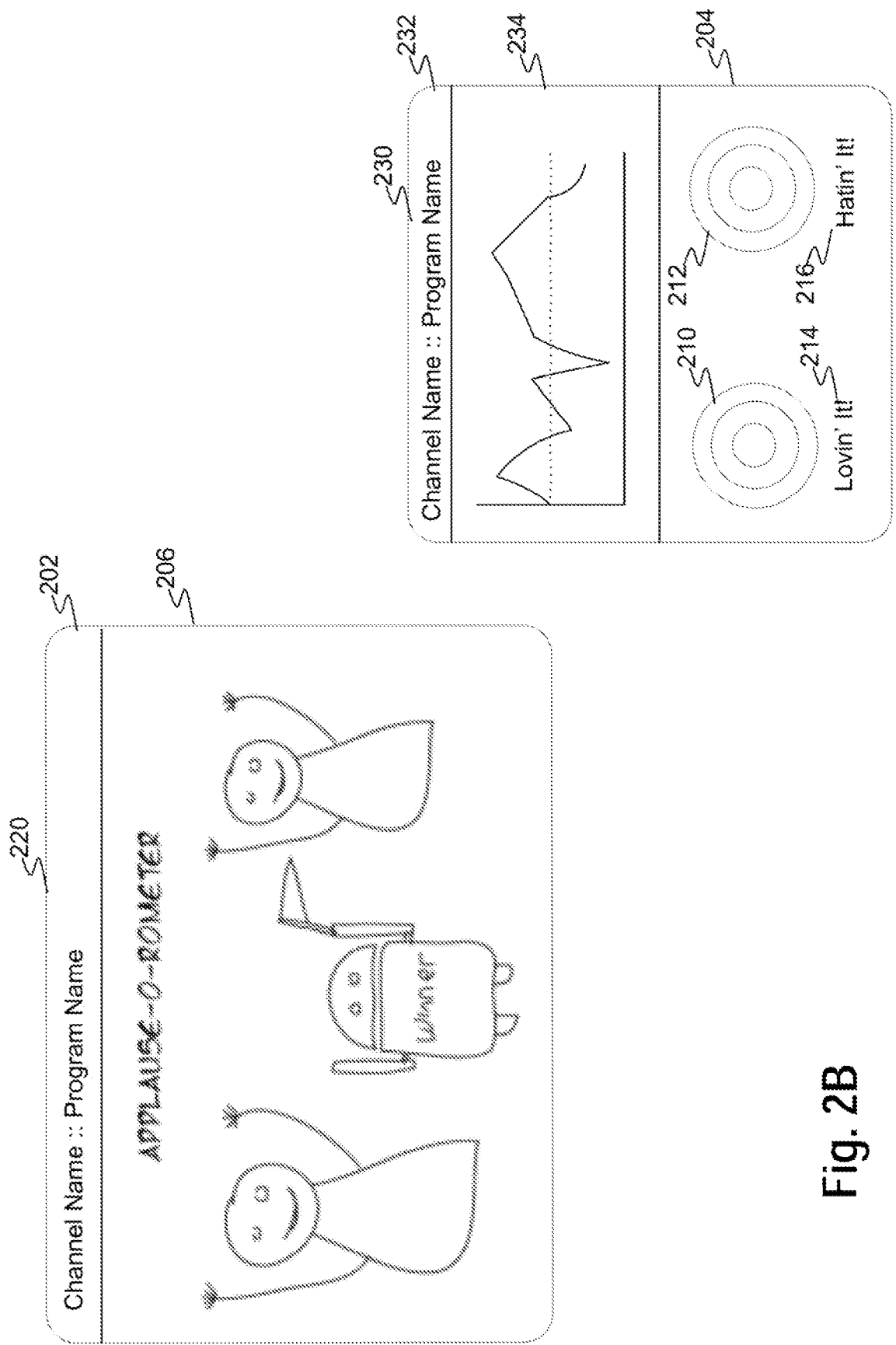
FIG. 2B is an illustration of a first device that can play media and a second device that can record sentimental information in accordance with an illustrative implementation.

FIG. 2B is an illustration of a first device that can play media and a second device that can record sentimental information in accordance with an illustrative implementation. In this implementation, a media player 220 is a separate device from a device 230 that contains the sentimental input module. For example, media player 220 can be a television, notebook, tablet, pad, etc. capable of playing a media signal. The media player 220 includes the viewing portion 206 of the screen and can also include the information portion 202. In some implementations, the information portion 202 is not shown. The device 230 is used to capture sentimental input in a similar manner compared to device 200 described above. In one implementation, the media player 220 can communicate with the device 230 over a network, such as network 102, or through a personal area network. In one implementation, the device 230 can communicate the sentimental information to the media player 220, which can then transmit the sentimental information to a sentimental server 106. In another implementation, the device 230 can communicate the sentimental information to a sentimental server 106.

The device 230 can also include an information portion 232 for displaying information associated with the media. A feedback portion 234 of the device 230 can be used for displaying information regarding recorded sentimental information. For example, the feedback portion 234 can provide a user with a history of their sentimental information for a particular media. The device 230 can also receive sentimental information from other users and display an average sentimental value. In one implementation, the sentimental information is associated with a live broadcast of media, such as a live television program, and the device 232 receives aggregated sentimental information from other users. This provides a user with live feedback of an average sentimental value for the live broadcast. Device 232 can also provide a haptic feedback to a user based upon received sentimental information. For example, when a large change in a sentimental amount is detected, the device 232 can shake. Haptic feedback can also be provided when a user's friend inputs sentimental information.

Figure 3:
FIG. 3 is a flow diagram of a process for recording sentimental information in accordance with an illustrative implementation.

FIG. 3 is a flow diagram of a process for recording sentimental information in accordance with an illustrative implementation. The process 300 can be implemented on a media player 108 or part of a sentimental input module 110. In one implementation, the process 300 is encoded on a computer-readable medium that contains instructions that when executed by a computing device cause the computing device to perform operations of process 300.

Recording of sentimental input starts when user input is detected (302). In one implementation, user input corresponds to a user pressing a sentimental input. When user input is detected, information associated with the input can be recorded. For example, information associated with the input can include the time that the user input is detected, the location on the screen associated with the user input, the sentimental identification, the amount of pressure applied to a sentimental input, etc. While the user continues to provide input, information associated with the input is recorded (304). Eventually, the end of the user input is detected (306). For example, the end of the user input can be associated with releasing of a sentimental input or a lack of pressure applied to a sentimental input. Once the end of the user input is detected, various sentimental information can be determined based in part on the recorded information associated with the user input. For example, the amount of pressure applied to a sentimental input can be used to calculate an amount of sentiment (308). The sentimental amount can be calculated in various ways, such as, by calculating the average pressure applied or the maximum amount of pressure applied to a sentimental input and correlating that with an amount of sentiment. A sentiment identification, such as positive or negative, can also be determined (310). For example, the location of the user input, an indication of the sentimental input pressed, or the movement of the user input can be used to determine the sentimental value associated with the user input. After these values are calculated, sentimental information can be sent to one or more sentimental servers (312). In one implementation, the sentimental identification, amount of sentiment, media identification information, and user identification information can be sent to a sentimental server. The user identification data can include a unique or semi-unique identifier that can be anonymized and is not connected with user names. In another implementation, the sentimental information can include portions of the recorded data, such as movement and location of the user input. In this implementation, the sentimental server can calculate or recalculate the amount of sentiment and the sentiment value.

Figure 4:
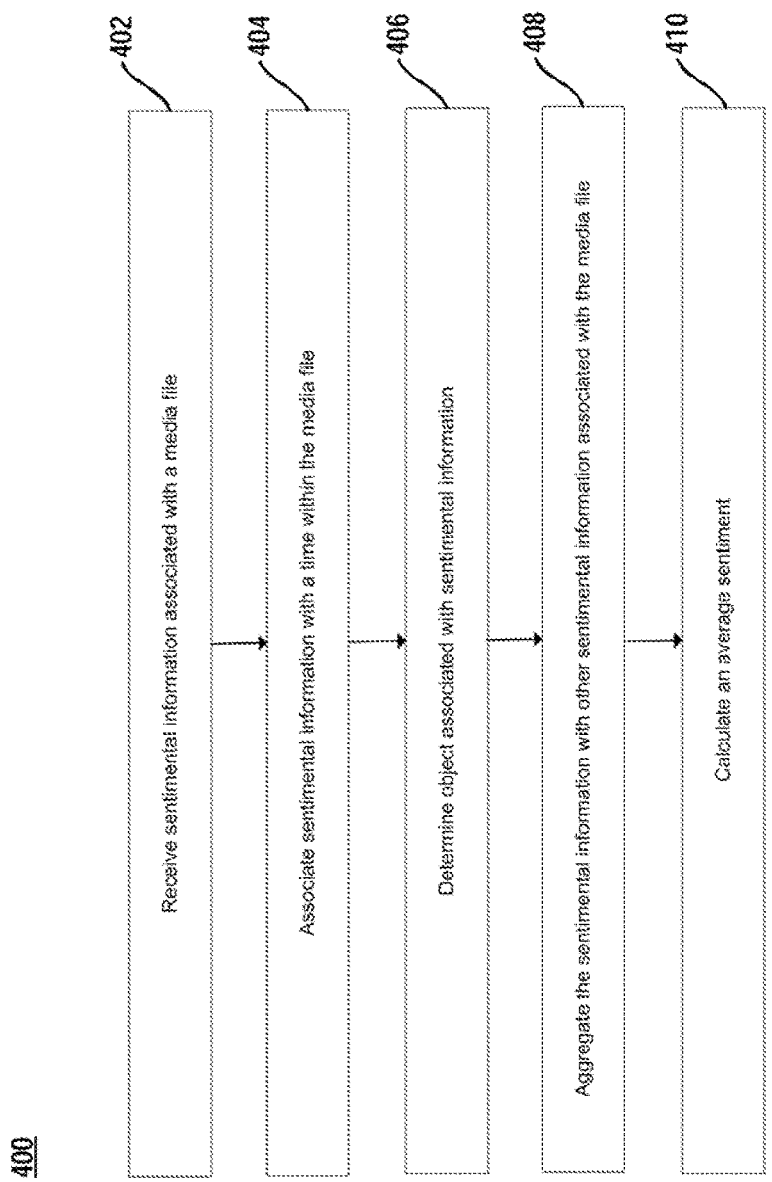
FIG. 4 is a flow diagram of a process that associates sentimental information with a displayed object associated with media in accordance with an illustrative implementation.

FIG. 4 is a flow diagram of a process that associates sentimental input with a displayed object associated with media in accordance with an illustrative implementation. A server, such as a sentiment server 106 receives sentimental information (402). The server can receive sentimental information from numerous users regarding various media. The sentimental information can include an anonymous user identifier used to associate the sentimental information with a user. A media identifier, that can be included in the sentimental information, can be used to associate the sentimental information with a particular media. Sentimental amounts can be associated generally with a media or can be associated with a particular portion of the media. Data within the sentimental information can be used to associate the sentimental information with a time within the media (404). The data can be any data that is used to indicate a time or a location within the media, such as, but not limited to, a time or time period within the media, a frame number, a range of frame numbers, etc. Once a portion of the media has been determined, the objects associated with the particular portion can be referenced. For video files, the objects can be characters, events, displayed objects, speakers, etc. For audio files, the objects can be instruments, lyrics, singers, speakers, etc. One or more objects are determined to be associated with the sentimental information (406).

In one implementation, the sentimental information is associated with an object based upon a transcript or closed caption information. In this implementation, the time information is used to determine the objects within the portion of the media. The object can be a character that is speaking the most words, a character speaking for the longest amount of time during the associated time period, the character that utters an exclamation, or music that is playing during the time period. In another implementation, speaker recognition can be used to determine the character that is speaking during a particular clip. The speaker recognition can be done on a media player or another device, and the recognized speaker can be included in the sentimental information. In another implementation, the speaker recognition has been done previously at a server such as a sentiment server 106, and the time information can be used to determine who was speaking the most, longest, and/or loudest during the time period. This character would then be the associated object for the sentimental input. Facial recognition can also be used to determine the characters that are present in a portion of a video. Movement of a character's mouth can indicate which characters are speaking at particular portions of videos. The facial recognition information can be determined in a similar manner compared to the speaker recognition. In one implementation, a media player or another device and the recognized speaker can be included in the sentimental information. In another implementation, the facial recognition has been done previously at a server such as a sentiment server 106, and the time information can be used to determine who was speaking the most, longest, and/or loudest during the time period. The perceived location of objects in portions of media can also be used to associate sentimental input with an object. In one implementation, characters or other visual objects in the foreground of the video can be used to identify an object associated with the sentimental input.

The object associated with sentimental input can also be deduced based upon an aggregation of sentimental information from one or more users. In one implementation, various sentimental information collected throughout a particular media or a portion of the media are analyzed to determine an object that is associated with some or all of the sentiment information. For example, a portion of the media where a character says a particular line or makes an introduction can be analyzed. If the number of users that recorded sentimental information during the portion of the media is above a predetermined threshold, the character can be the object associated with the sentimental information. In addition, multiple portions of the media can be analyzed. For example, portions of the media that include a particular character or object can be analyzed. If a user has consistent sentimental information with two or more of these portions, the particular character or object can be associated with the sentimental information. As an example, if a user inputs a negative sentiment for a majority of portions that include a particular character's entrance or a particular object, that character or object can be associated with the user's negative sentiment. In another implementation, the sentimental information from one or more users that includes the same sentimental identifier is used to determine the object associated with one or more of the sentimental information. For each sentimental information, the portion of the media associated with the sentimental information is determined. Next, the objects associated with the portion of the media are determined, and a running counter associated with each object is incremented. This repeats for each sentimental information. The object with the highest count is determined to be the associated object and is associated with each sentimental information associated with a media portion that contains the determined object.

Information received from another source can also be used to determine an object associated with user sentiment. For example, assume a live broadcast of an awards show. During the show multiple sentimental information can be input by users and received by sentiment servers. The sentimental input can include timing information regarding when in the program the sentimental information was recorded. Monitoring search results and/or social media sites at a time associated with a broadcast of the awards show, an increase in the usage of a person's name can be used as the object associated with the sentimental information. To limit the amount of data, filtering can be used. In one example, search results or social media data are filtered based upon an identifier of the awards show or other media. Such filtering reduces the amount of data that is analyzed and also increases accuracy in associating the sentimental input with an object.

In yet another implementation, the location pressed on a media player or other device can be used to associate sentimental information with an object. In one implementation, a media player or other device with a touch screen is used. Instead of using dedicated sentimental inputs, a user inputs sentimental data by pressing directly on a character or object. In this embodiment, the character or object is the sentimental input. The user can indicate the sentimental identifier through a gesture, such as by pressing and moving up for positive or down for negative. The location where the user pressed the screen can be used to determine what character or object to associate with the sentimental information. In one implementation, the relative location of the user's input on the screen is sent as part of the sentimental information to a sentiment server. The sentiment server can determine the closest object near the user's input based upon data that describes the location of characters and/or objects within the media.

Figure 5:
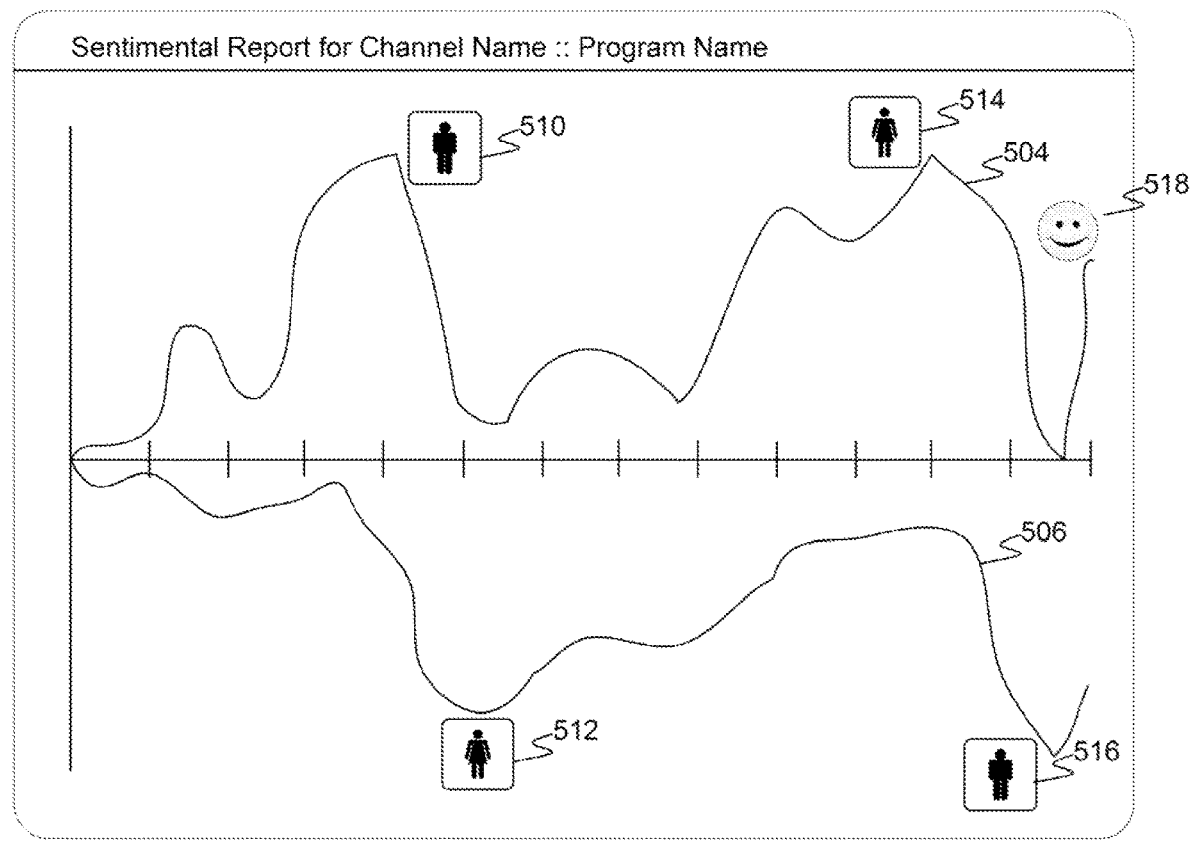
FIG. 5 is an exemplary report illustrating positive and negative sentiments of multiple users associated with media in accordance with an illustrative implementation.

Once the sentiment servers collect sentimental data, the sentimental data can be used in various ways. Generating a report is one example. FIG. 5 is an exemplary report illustrating positive and negative sentiments of multiple users associated with media in accordance with an illustrative implementation. The report 500 includes the average positive sentiment 504 and negative sentiment 506 calculated across one or more users playing the media. The average sentiments 504 and 506 can be calculated across a single, multiple, or all playings of media. In addition, the report can be based upon a single user or can include multiple users. In one implementation, the users share a common trait such as age, geographic location, time of playing, date of playing, etc. The report 500 can include an indication of one or more objects associated with portions of the sentiments 504 and 506. Icons 510, 512, 514, and 516 can indicate the sentiment is related to a particular character. Selecting an icon, such as by clicking or hovering over an icon, can bring up information associated with the character and the particular point in the media. In one implementation, selecting an icon displays a link or directly links to a video clip associated with the sentimental data. For example, clicking on icon 512 can result in being directed to a portion in the media immediately prior to the low sentimental information recording. Icon 518 can indicate that the increase in user sentiment is associated with something other than a character. For example, the icon 518 might indicate that the sentimental information is associated with a happy ending, the resolution of a conflict, etc. The report 500 can also include an average sentiment based upon the above of two or more provided sentiments.

In another implementation, a report can be generated for a particular character or object within media. For example, a report can indicate when a particular character or object was present in media. The average sentiment for each portion of the media that includes the character or object can be displayed. Reports can include one or more of all sentimental information associated with the portions of the media, sentimental information associated with the particular character or object, and the sentimental information that is not associated with the particular character or object. The peak sentimental amounts can also be presented in the report. Reports can be generated for one or more objects contained within the media. These reports can be compared to one another and can provide an indication as to how much a particular object and/or character is liked/disliked by viewers.

The sentimental information can also be used to create or modify a laugh track. For example, an initial laugh track can be created for a particular media. After a predetermined amount of sentimental information is received, the laugh track can be modified based upon the sentimental information. The laugh track can continue to change based upon received sentimental information. For example, a laugh track can be updated on a time schedule, based upon the amount of received sentimental information, based upon a change in received sentimental information, etc. In one example, the extremely disliked portions of media can be determined. Boos, hissing, or some other negative sound clip can be inserted into the laugh track to correspond with the sentimental information. The laugh track can also be modified to increase the volume of boos, hissing, etc. at the associated time. Additionally, portions of the video corresponding to peaks of positive sentiment, such as liked or funny portions, can be used to insert or increase the volume of laughter, applause, etc. The volume and/or amount of laughter, boos, etc. can also be reduced based upon the received sentimental input. Media may have one or more laugh tracks. For example, a single laugh track can be used for the media. In another implementation, a laugh track can be generated for a particular user or group of users based upon collected sentimental input. In one example, a group of users that like a particular media will have a laugh track that includes more and/or louder applause/laughter compared to a group that disliked the particular media. A second laugh track with less and/or quieter applause/laughter can be provided to the group of users that disliked the particular media.

Sentimental information can also be used to create a list of media clips for one or more users. For example, a list of most liked and most disliked video clips can be created for a single user based upon that user's sentimental information. In another implementation, the list can be generated based upon one or more users, such as the sentimental input of a user's friends. Using the sentimental information, other video clips can be recommended to a user. As one example, a user's favorite video clips are determined and other users that similarly liked one or more of the video clips are determined. Video clips that are well liked by the other users can be recommended to the user. In another implementation, the characters and/or objects associated with a user's funniest video clips can be determined. Other video clips that include the characters and/or objects can be recommended to the user.

Sentimental information from one or more users can also be provided to a user that is currently playing media. As illustrated in the feedback portion 234 of the device 230 illustrated in FIG. 2B, a graph of the sentimental information can be provided that corresponds to the media currently being played. Such information can spur a viewer of the media to provide their own sentimental information.

Figure 6:
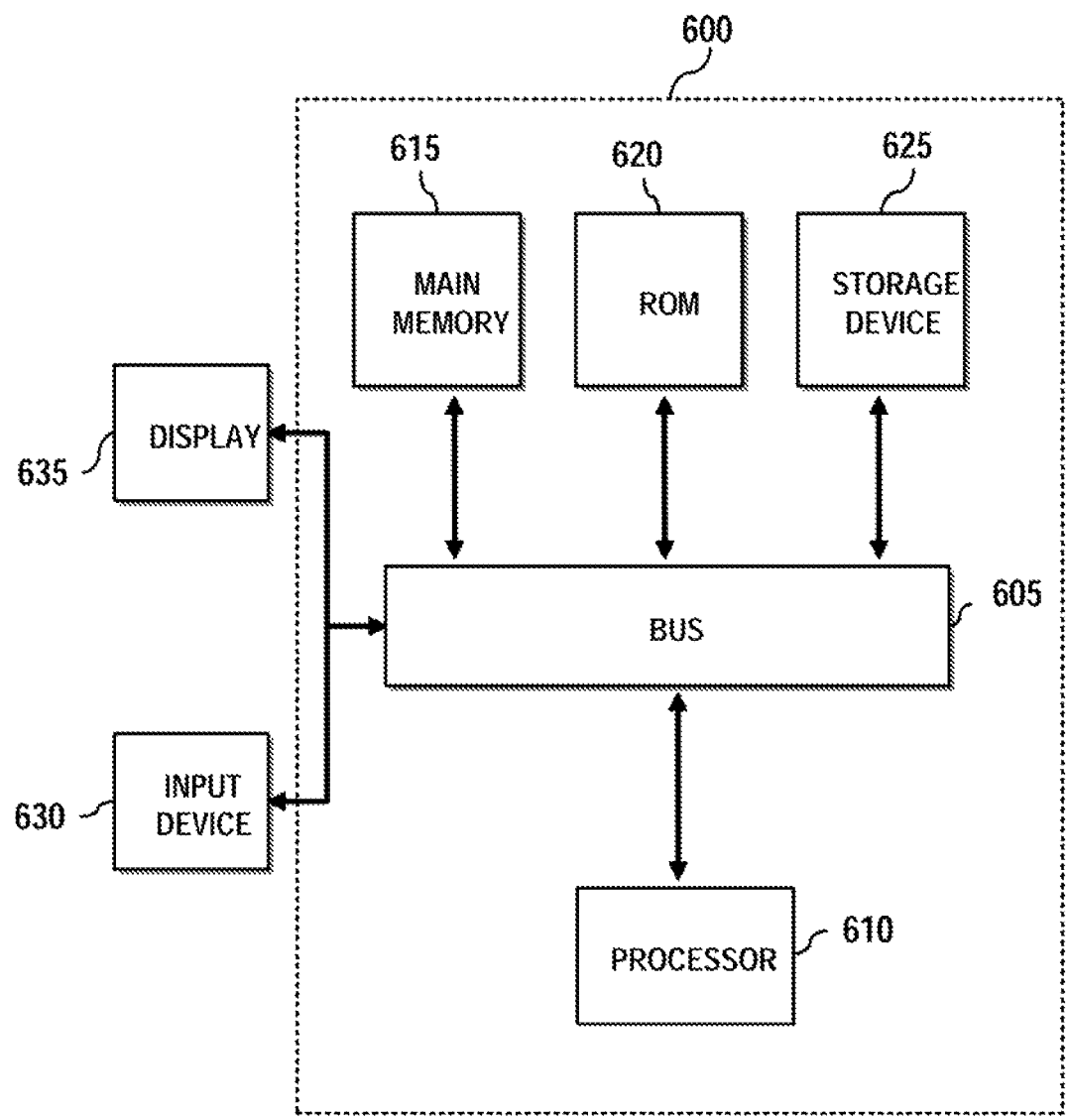
FIG. 6 is a block diagram of a computer system in accordance with an illustrative implementation.

FIG. 6 is a block diagram of a computer system in accordance with an illustrative implementation. The computer system or computing device 600 can be used to implement a media player 108, a sentimental input module 110, a media server 104, and/or a sentiment server 106. The computing system 600 includes a bus 605 or other communication component for communicating information and a processor 610 coupled to the bus 605 for processing information. The computing system 600 also includes main memory 615, such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 610 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information, and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

According to various implementations, the processes that effectuate illustrative implementations that are described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to implement illustrative implementations. Thus, implementations are not limited to any specific combination of hardware circuitry and software.

Although an example computing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for generating sentimental information associated with media content, the method comprising:
   receiving, from a first user device, a first user input that corresponds to a first sentiment input region selected at a first time point and receiving, from a second user device, a second user input that corresponds to a second sentiment input region selected at a second time point, wherein the first time point is within a period of time during which a first user interface is presenting a media content item on the first user device and wherein the second time point is within the period of time during which the first user interface is presenting the media content item on the second user device; and
   causing a second user interface to be presented on a third user device, wherein the second user interface concurrently presents sentiment input regions that are each associated with a different sentiment for the presented media content item in a sentiment portion of the second user interface and a timeline representation of the media content item including sentimental information that at least indicates the first user input from the first user device at the first time point of the media content item and the second user input from the second user device at the second time point of the media content item.

2. The method of claim 1, wherein the timeline representation of the media content item that includes sentimental information indicates an average amount of sentiment indicated by a plurality of user devices, wherein the plurality of user devices includes the first user device and the second user device.

3. The method of claim 1, wherein the first sentiment input region corresponds to a positive sentiment.

4. The method of claim 1, wherein the second sentiment input region corresponds to a negative sentiment.

5. The method of claim 1, wherein the timeline representation is presented in connection with at least one selectable icon, and wherein information associated with a time point of the media content item corresponding to the at least one selectable icon is presented on the third user device in response to determining that the at least one selectable icon has been selected.

6. The method of claim 1, wherein selection of a portion of the timeline representation causes playback of the media content item to skip to a portion of the media content item corresponding to the selected portion of the timeline representation.

7. A system for generating sentimental information associated with media content, the system comprising:
a memory; and
a hardware processor coupled to the memory that is configured to:
receive, from a first user device, a first user input that corresponds to a first sentiment input region selected at a first time point and receive, from a second user device, a second user input that corresponds to a second sentiment input region selected at a second time point, wherein the first time point is within a period of time during which a first user interface is presenting a media content item on the first user device and wherein the second time point is within the period of time during which the first user interface is presenting the media content item on the second user device; and
cause a second user interface to be presented on a third user device, wherein the second user interface concurrently presents sentiment input regions that are each associated with a different sentiment for the presented media content item in a sentiment portion of the second user interface and a timeline representation of the media content item including sentimental information that at least indicates the first user input from the first user device at the first time point of the media content item and the second user input from the second user device at the second time point of the media content item.

8. The system of claim 7, wherein the timeline representation of the media content item that includes sentimental information indicates an average amount of sentiment indicated by a plurality of user devices, wherein the plurality of user devices includes the first user device and the second user device.

9. The system of claim 7, wherein the first sentiment input region corresponds to a positive sentiment.

10. The system of claim 7, wherein the second sentiment input region corresponds to a negative sentiment.

11. The system of claim 7, wherein the timeline representation is presented in connection with at least one selectable icon, and wherein information associated with a time point of the media content item corresponding to the at least one selectable icon is presented on the third user device in response to determining that the at least one selectable icon has been selected.

12. The system of claim 7, wherein selection of a portion of the timeline representation causes playback of the media content item to skip to a portion of the media content item corresponding to the selected portion of the timeline representation.

13. A non-transitory computer-readable medium containing computer executable instructions that, when executed by a processor, cause the processor to perform a method for generating sentimental information associated with media content, the method comprising:
receiving, from a first user device, a first user input that corresponds to a first sentiment input region selected at a first time point and receiving, from a second user device, a second user input that corresponds to a second sentiment input region selected at a second time point, wherein the first time point is within a period of time during which a first user interface is presenting a media content item on the first user device and wherein the second time point is within the period of time during which the first user interface is presenting the media content item on the second user device; and
causing a second user interface to be presented on a third user device, wherein the second user interface concurrently presents sentiment input regions that are each associated with a different sentiment for the presented media content item in a sentiment portion of the second user interface and a timeline representation of the media content item including sentimental information that at least indicates the first user input from the first user device at the first time point of the media content item and the second user input from the second user device at the second time point of the media content item.

14. The non-transitory computer-readable medium of claim 13, wherein the timeline representation of the media content item that includes sentimental information indicates an average amount of sentiment indicated by a plurality of user devices, wherein the plurality of user devices includes the first user device and the second user device.

15. The non-transitory computer-readable medium of claim 13, wherein the first sentiment input region corresponds to a positive sentiment.

16. The non-transitory computer-readable medium of claim 13, wherein the second sentiment input region corresponds to a negative sentiment.

17. The non-transitory computer-readable medium of claim 13, wherein the timeline representation is presented in connection with at least one selectable icon, and wherein information associated with a time point of the media content item corresponding to the at least one selectable icon is presented on the third user device in response to determining that the at least one selectable icon has been selected.

18. The non-transitory computer-readable medium of claim 13, wherein selection of a portion of the timeline representation causes playback of the media content item to skip to a portion of the media content item corresponding to the selected portion of the timeline representation.

* * * * *